(12) United States Patent
Pai et al.

(10) Patent No.: US 9,020,120 B2
(45) Date of Patent: Apr. 28, 2015

(54) TIMELINE INTERFACE FOR MULTI-MODAL COLLABORATION

(71) Applicant: Avaya Inc., Basking Ridge, NJ (US)

(72) Inventors: Deep Subhash Pai, Pune (IN); Jaydeep Deepak Bhalerao, Pune (IN)

(73) Assignee: Avaya Inc., Basking Ridge, NJ (US)

( * ) Notice: Subject to any disclaimer, the term of this patent is extended or adjusted under 35 U.S.C. 154(b) by 0 days.

(21) Appl. No.: 13/760,668

(22) Filed: Feb. 6, 2013

(65) Prior Publication Data
US 2014/0219433 A1 Aug. 7, 2014

(51) Int. Cl.
*H04M 3/42* (2006.01)
*H04M 3/56* (2006.01)

(52) U.S. Cl.
CPC .............. *H04M 3/565* (2013.01); *H04M 3/567* (2013.01)

(58) Field of Classification Search
CPC .... H04M 3/56; H04M 3/565; H04L 12/1813; H04L 12/1818; H04L 12/1822
USPC .......... 379/202.01, 201.01, 201.04; 715/753, 715/758; 345/619; 455/416
See application file for complete search history.

(56) References Cited

U.S. PATENT DOCUMENTS

| | | | |
|---|---|---|---|
| 5,786,814 A | 7/1998 | Moran et al. | |
| 7,167,833 B2 * | 1/2007 | Mashiko et al. | 705/7.16 |
| 7,598,975 B2 | 10/2009 | Cutler | |
| 7,995,074 B2 * | 8/2011 | Okamoto et al. | 345/619 |
| 2006/0212583 A1 | 9/2006 | Beadle et al. | |
| 2010/0138756 A1 * | 6/2010 | Saund et al. | 715/758 |
| 2010/0241700 A1 | 9/2010 | Rasmussen et al. | |
| 2011/0107236 A1 * | 5/2011 | Sambhar | 715/753 |
| 2011/0113348 A1 | 5/2011 | Twiss et al. | |
| 2011/0267419 A1 | 11/2011 | Quinn et al. | |
| 2012/0162349 A1 | 6/2012 | Alexandrov et al. | |
| 2012/0219140 A1 * | 8/2012 | Iga et al. | 379/202.01 |
| 2013/0254279 A1 * | 9/2013 | Bentley et al. | 709/204 |

OTHER PUBLICATIONS

Combined Search and Examination Report for United Kingdom Patent Application No. GB1401780.0, dated Jul. 21, 2014 8 pages.

* cited by examiner

*Primary Examiner* — Thjuan K Addy
(74) *Attorney, Agent, or Firm* — Sheridan Ross P.C.

(57) ABSTRACT

A system, method, and computer readable medium are provided to manage a conference. The start of a conference is identified. For example, the start of the conference is identified when a host dials into a conference bridge. A timeline is created for the conference based on a first event that occurs at the start of the conference. The timeline includes the first event. The timeline is updated in real-time with a second event, as a second event occurs during the conference. This process is repeated throughout the conference. The timeline is rendered for display to one or more participants in the conference. The conference is then displayed to the conference participants, thus providing the conference participants with a real-time timeline of the conference.

20 Claims, 7 Drawing Sheets

TIMELINE INTERFACE FOR MULTI-MODAL COLLABORATION

TECHNICAL FIELD

The systems and methods relate to user interfaces and in particular to multi-modal user interfaces for a conference.

BACKGROUND

When a user joins a conference such as an audio conference, the participant may only be able to hear when a participant joins the audio conference. Some audio applications include a visual interface that can show a roster of who is on the conference call. If a participant joins a conference after the conference has started, the participant is unaware of what events have occurred previously in the conference, such as if a specific topic was discussed or who exactly is on a conference call.

Video conference systems likewise have similar problems. Even though a display of each of the participants may be shown each individual participant in the conference, a participant that joins the conference after the conference has started will not know specific topics that have been discussed. The user may have to interrupt the conference to determine what was previously discussed. This can cause a disruption to the conference because discussion may have to be presented again to the participant that joined the conference late. What is needed is a user interface that provides a participant a running timeline of events that have occurred in a conference so that the use can easily ascertain what specific events have occurred during the course of the conference.

SUMMARY

Systems and methods are provided to solve these and other problems and disadvantages of the prior art. A system, method, and computer readable medium are provided to manage a conference. The start of a conference is identified by a conference bridge. For example, the start of the conference is identified when a host dials into the conference bridge. A timeline is created by a timeline generator for the conference based on a first event that occurs at the start of the conference. The timeline includes the first event. The timeline is updated in real-time by the timeline generator with a second event, as a second event occurs during the conference. This process is repeated throughout the conference. The timeline is rendered by a presentation module for display to one or more participants in the conference. The conference is then displayed to the conference participants, thus providing the conference participants with a real-time timeline of the conference.

In an embodiment, the first or second event comprise at least one of the following: an indication of a start of the conference; an indication of a participant joining the conference; an indication of a plurality of participants joining the conference from a conference room; an indication of an additional one of plurality of participants joining the conference from the conference room; an indication of the participant leaving the conference; an indication of the plurality of participants leaving the conference from the conference room; an indication of one of the plurality of participants leaving the conference from the conference room; an indication of when the participant speaks during the conference; an indication of when the participant has raised their hand during the conference; an indication that the participant joined the conference via a telephone; an indication that the participant joined the conference via a videophone; an indication that the participant is viewing conference via a web conference; an indication that the participant is a required participant and has not joined the conference; an indication that the participant has not joined the conference; an indication that a tag was added to the timeline; an indication of content that was presented during the conference; a poll event; a voting event; a voting results event; and a creation of an external chat or voice session between two or more participants in the conference.

In an embodiment, the second event is the indication of when the participant speaks during the conference. Selecting the second event provides at least one of a recording of what the participant spoke during a segment of the timeline or providing a text representation of what the participant spoke during the segment of the timeline.

In an embodiment, the timeline contains a compressed event that represents a plurality of events.

In an embodiment, the compressed event represents at least one of the following: events that have occurred during a segment of time of the conference; events that have occurred at the beginning of the conference; events that have occurred at the end of the conference; events that have occurred during a presentation of a specific slide; events that have occurred between tags set by a participant; and events that have been selected by the participant.

In an embodiment, the timeline displays at least two events of at least two participants in the conference. The at least two events indicate that the at least two participants were engaged in a conversation with each other as a part of the conference.

In an embodiment, selecting the first or second event opens a context menu that is displayed above the respective selected first or second event in the timeline. The context menu contains items specific to the respective selected first or second event.

In an embodiment, the selected first or second event is a participant event. The context menu comprises a filter item. A selection detector is configured to receive an indication of a selection of the filter item. In response to receiving the selection of the filter item, a filter module is configured to filter the timeline to only display participant events.

In an embodiment, the selected first or second event is a participant event of an individual participant. The context menu comprises a chat item. A selection detector is configured to receive an indication of a selection of the chat item. A presentation module is configured to provide a menu to select at least the individual participant to have a chat with. A conference bridge is configured to establish a chat session with at least the individual participant.

In an embodiment, a main menu displays selections regarding the conference. The main menu selections comprise one or more of a content selection, a participant selection, a timeline selection, an exit selection, and a multi-level icon.

In an embodiment, main menu is displayed using at least one of a bar menu and a jackknife menu.

DETAILED DESCRIPTION

Figure 1:
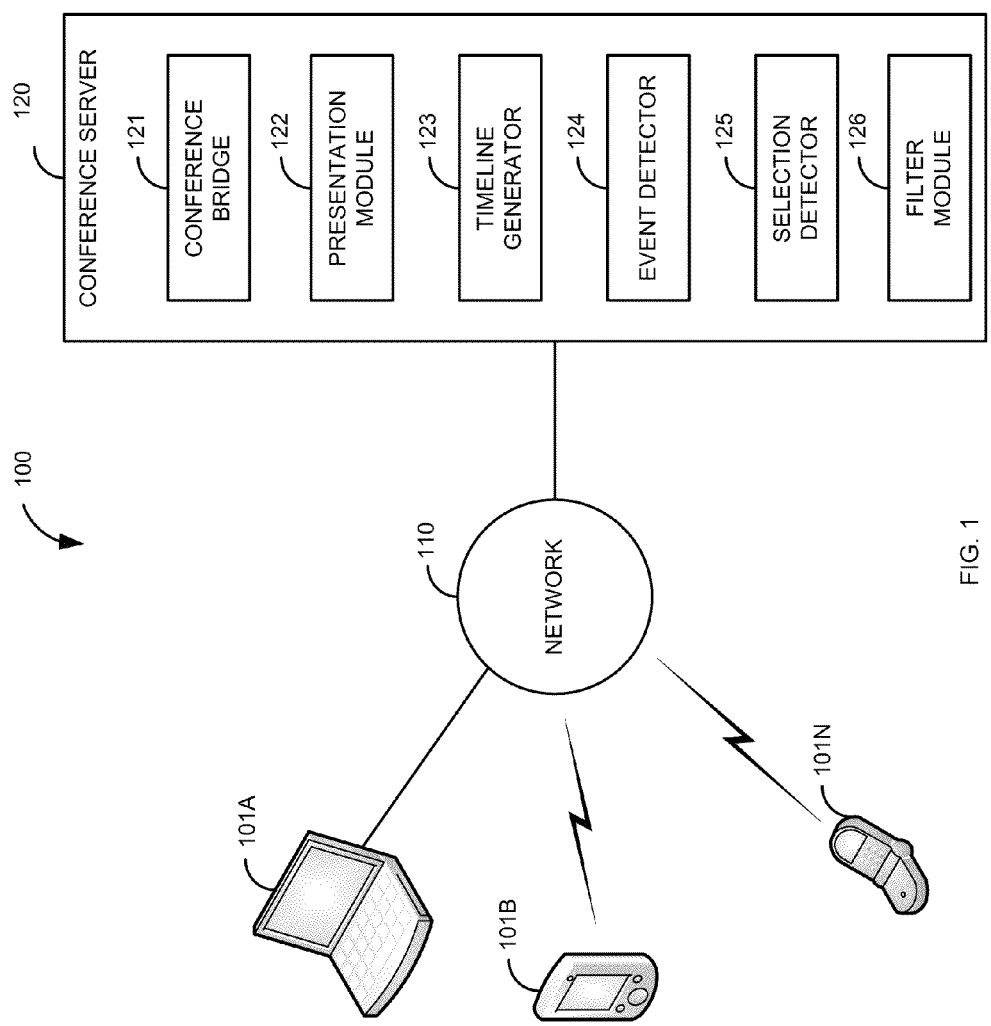
FIG. 1 is a block diagram of a first illustrative system for rendering and displaying a timeline of a conference.

FIG. 1 is a block diagram of a first illustrative system 100 for rendering and displaying a timeline of a conference. The first illustrative system 100 comprises communication devices 101A-101N, network 110, and conference server 120. The communication devices 101A-101N may be any device that can communicate on the network 110, such as a Personal Computer (PC), a telephone, a video system, a cellular telephone, a Personal Digital Assistant (PDA), a tablet device, a notebook device, and the like. As shown in FIG. 1, any number of the communication devices 101A-101N may be connected to network 110. In addition, any number of the communication devices 101A-101N may be directly connected to the conference server 120.

The network 110 can be any network that can send and receive information, such as the Internet, a Wide Area Network (WAN), a Local Area Network (LAN), the Public Switched Telephone Network (PSTN), a packet switched network, a circuit switched network, a cellular network, a combination of these, and the like. The network 110 can use a variety of protocols, such as Ethernet, Internet Protocol (IP), Session Initiation Protocol (SIP), Integrated Services Digital Network (ISDN), and the like.

The conference server 120 can be any device that provides conferencing services, such as a Private Branch Exchange (PBX), a video server, a central office switch, an audio server, a mixer, and the like. The conference server 120 comprises a conference bridge 121, a presentation module 122, a timeline generator 123, an event detector 124, a selection detector 125, and a filter module 126. The elements of the conference server 121-126 are shown as part of the conference server 120. However, the elements of the conference server 121-126 may be distributed in various devices across network 110.

The conference bridge 121 can be any hardware/software that provides conferencing services, such as a mixer, an audio conference system, a video conference system, an Instant Message server, a PBX, a central office switch, and/or the like. The presentation module 122 can be any hardware software that can render data for display to a user, such as a web server, a distributed client server application, a software application running on communication device 101, a web browser, a video processor, a combination of these, and the like. The timeline generator 123 can be any hardware/software that can create a timeline for a conference.

The event detector 124 can be any hardware/software that can detect events, such as an indication of a start of the conference, a indication of a participant joining the conference, an indication of a plurality of participants joining the conference from a conference room, an indication of an additional one of plurality of participants joining the conference from the conference room, an indication of the participant leaving the conference, an indication of the plurality of participants leaving the conference from the conference room, an indication of one of the plurality of participants leaving the conference from the conference room, an indication of when the participant speaks during the conference, an indication of when the participant has raised their hand during the conference, an indication that the participant joined the conference via a telephone, an indication that the participant joined the conference via a videophone, an indication that the participant is viewing the conference via a web conference, an indication that the participant is a required participant and has not joined the conference, an indication that the participant has not joined the conference, an indication that a tag was added to the timeline, an indication of content that was presented during the conference, a poll event, a vote event, a voting results event, a creation of a chat or voice session between two or more participants in the conference and/or the like. The selection detector 125 can be any hardware/software that can detect selection of input from a user such as a mouse, a touch screen, a voice response system, a remote control, a trackball, a web browser, a software application, and/or the like. The filter module 126 can be any hardware/software that can filter events in a timeline.

The conference bridge 121 identifies the start of a conference. The conference bridge 121 can identify the start of a conference in various ways, such as a participant calling into the conference bridge 121, a host or specific user calling into the conference bridge 121, based on scheduled calendar event, based on a indication by a participant that the conference has started, based on all required conference participants calling the conference bridge 121, based a display of a presentation in the conference, and/or the like. The conference can be any type of conference, such as an audio conference, a video conference, a text conference, and the like. The conference can be between two or more participants, but will typically include three or more participants.

The timeline generator 123 creates a timeline for the conference based on an event that occurs at the start of the conference. The event that occurs at the first of the conference is included in the timeline. The event that occurs at the start of the conference can be any of the events defined above that the conference bridge 121 uses to identify the start of the conference. Alternatively, the event that occurs at the start of the conference may be different. For example, the event that the conference is started may be based on a calendar event and the event that occurs at the start of the conference may be when a first participant calls the conference bridge 121. The event that occurs at the start of the conference may occur before, concurrently, or after the identified start of the conference.

The timeline is a record of events that occur during the conference. For instance, an individual participant walking out of or coming into a conference room, a participant making a gesture, and the like. Individual participants in the conference may be identified in a variety of ways, such as by voice recognition, facial recognition, phone numbers, and/or the like. For example, an individual participant can be identified as leaving or joining a plurality of participants in a conference room using facial and/or voice recognition. Likewise, each participant in a conference room can be identified using facial and/or voice recognition.

The timeline generator 123 updates the timeline in real-time with various events as the events occur in the conference. This gives the user a real-time view of different events that occur during the conference. For example, as a second event occurs (e.g., as participants join the conference) during the conference, the timeline is updated with the second event in real time. Presentation module 122 renders the timeline for display to participants of the conference. The timeline may be displayed to a single participant such as the host, to a defined group of participants, or to all participants. In addition, the timeline displayed to one participant may be different than the timeline displayed to other participants. For example, the host of the conference may be provided with a timeline that shows participants that are required to join the conference but have not; while the other participant's timelines do not display this. For participants that are required to join, but currently have not joined, the timeline, in an embodiment, can show the event for the required participants who have joined always at the right side (or in a designated place in the timeline) of the timeline.

The timeline may include one or more compressed events that represent a plurality of events. For example, a compressed event may represent a discussion by two or more participants in the conference. A compressed event may represent events that have occurred during a segment of time of the conference. In one embodiment, the system and method compress events at the beginning of the conference as the conference progresses. This allows a participant who has joined to conference late to go back and select the compressed event to get greater detail of the beginning of the conference. Alternatively, the timeline can be compressed at both ends of the timeline as a user views the timeline (e.g., by scrolling the timeline) of the conference.

The timeline can be compressed based on events that have occurred during the conference. For example, a compressed event can be generated to represent all the events that have occurred during the presentation of a specific slide, during specific items in an agenda, between tags set by a participant, and/or the like. Moreover, a participant can generate a compressed event based on the participant selecting events in the timeline. Thus, a single compressed event may represent selected events that occur in the timeline before and after non-compressed events in the timeline. How compressed events are used and displayed can be user defined and/or administrator defined. For example, compressed events can be displayed based on a user preference.

Figure 2:
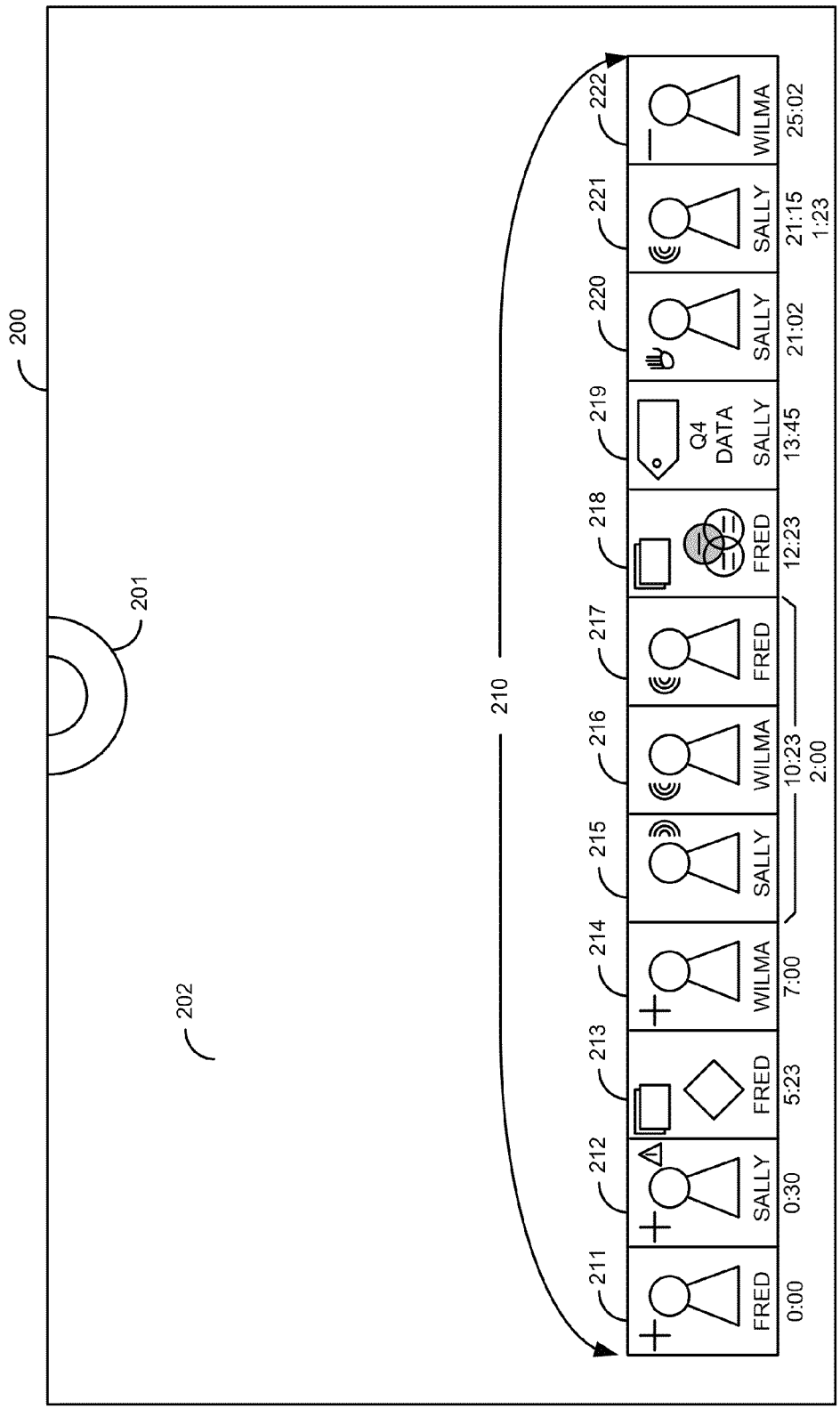
FIG. 2 is a diagram of a display of a timeline.

FIG. 2 is a diagram of a display 200 of a timeline 210. FIG. 2 comprises the display 200, a main menu button 201, a content area 202, and the timeline 210. The display 200 can be a full screen display in communication device 101, a window in communication device 101, and the like. The main menu button 201 is a button that can display a menu to a participant in the conference (see FIG. 3 for an example of a menu 301 that is displayed by selecting main menu button 201). The content area 202 is an area for displaying content of the conference. For example, the content area 202 can display slide shown of a multimedia conference, participants of a video conference, text of an audio conference, and the like.

The timeline 210 contains events 211-222. The timeline 210 may contain a variety of events, such as participant events (211, 212, 214-217, and 220-222), content events (213 and 218), tag events (219), sidebar discussion events (e.g., an external chat event or external phone conversation event (not shown)), poll or vote events (not shown), audio events (e.g., a presented recording (not shown), a conference start event, a conference end event, and/or any event that may be associated with a conference. The timeline 210 is updated in real-time with the events as the event occurs during the conference.

The event 211 is a participant event which shows that participant Fred joined the conference (indicated by the + sign) at the beginning of the conference (indicated by the 0:00). In this example, the numbers below the events 211-222 indicate a time since the start of the conference. However, the numbers could be based on the actual time the event occurred (e.g., 10:00 AM MST). The event 212 shows that participant Sally joined the conference thirty seconds later (indicated by the 0:30 below event 212). The event 212 also shows that Sally is a required participant in the conference (indicated by the triangle with the ! in the upper right hand corner). The event 213 shows that Fred started his presentation 5:23 minutes into the conference. The event 213 also shows the slide that Fred presented (indicated by the diamond). The event 214 shows that Wilma joined the conference at 7:00 minutes into the conference.

The events 215-217 show that participants Wilma, Sally, and Fred were engaged in a conversation with each other (indicated by the 3 half circles in each event and the 10:23 with the brackets). The conversation started at 10:23 and lasted 2 minutes. In this example, there are three participants. However, in other embodiments the number of participants engaged in a conversation can be anywhere from two participants to all the participants in the conference. For example, if only Sally and Wilma were engaged in a conversation, the display of events 215 and 216 would be sufficient. This is because the two half circle sets in events 215 and 216 are next to each other in the timeline 210, indicating that Wilma and Sally are engaged in a conversation with each other.

If a participant wants to hear what an individual participant spoke in the conversation, the participant could select a specific event (215-217) for a specific participant that was engaged in the conversation. Alternatively, the participant could select specific or all participant events to get the respective conversation(s) of the selected participant(s). Selecting all the participants would give the full conversation of Sally, Wilma, and Freed for the two minutes.

The event 218 shows that Fred continued his presentation at 12:23 by showing a second slide (indicated by the three circles). At 13:45, Sally tagged the timeline to include a tag named "Q4 DATA." A tag event allows a participant to enter notes that the participant can use later. The event 220 (a gesture event) shows that Sally raised her hand at 21:02 minutes. The event 221 indicates that Sally spoke for 1:23 minutes starting at 21:15 minutes. The event 222 indicates that Wilma exited the conference (indicated by the – sign) at 25:02 minutes.

The timeline 210 is shown in FIG. 2 as containing all the events for the conference. The timeline 210, depending on configuration and length of the conference, may contain any number of events. To compensate for a large number of events, the timeline 210, as the conference progresses, may provide scroll bars that allow the user to scroll through the timeline 210. In addition, the timeline 210 may contain compressed events as discussed previously.

The timeline 210 may contain other types of events, such as an event for voting. A voting event can be added to the timeline by a participant. When a participant clicks on the voting event, a list of possible voting options is displayed to the participant. After the voting is complete, a voting results event can be placed in the timeline 210. The participant can click on the voting results to view the results of the vote.

Other types of events that may be in the timeline 210 can be gesture events. For instance, a gesture event can be someone shaking their head, a participant waving their hand, a participant raising their hand, a participant smiling or frowning, and the like. Still other events can be based on a specific phrase spoken (as defined in a profile) by a participant or group of participants. For example, if a participant says a specific phrase such as "that is wrong," this results in a participant event being placed in the timeline 210. The participant event can indicate the specific word or phrase.

Figure 3:
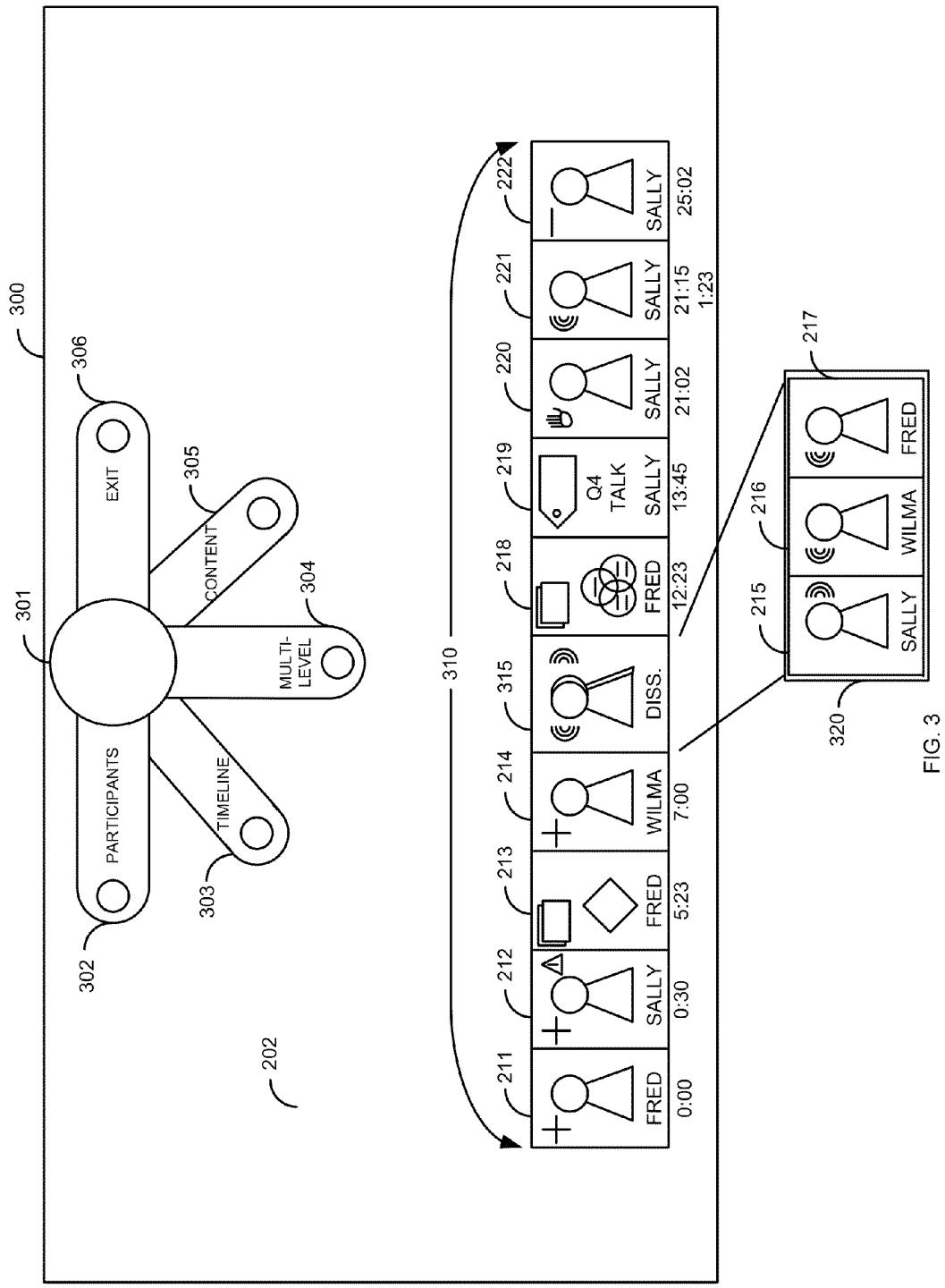
FIG. 3 is a diagram of a display of a compressed event.

FIG. 3 is a diagram of a display 300 of a compressed event 315. FIG. 3 comprises the display 300, a main menu 301, the content area 202, a timeline 310, and a compressed timeline window 320. The main menu 301 is an exemplary menu that is displayed when a participant selects the main menu button 201 (shown in FIG. 2). The main menu 301 is shown as jackknife menu. In an alternative, the main menu 301 may be show using a bar menu or any other type of menu. In another embodiment, the main menu 301 is shown as a jackknife menu without text (but with icons). The main menu 301 comprises selections 302-306. The selections 302-306, when selected, are detected by detection selector 125. Although shown with specific types of selections, the main menu 301 can comprise any number of different selections. The participant selection 302, when selected, displays a timeline 310 that only comprises participant events (211-212, 315, and 220-222). The timeline selection 303, when selected, displays the timeline 310. The multi-level selection 304, when selected, displays the timeline 310 using compressed events. Selecting the multi-level selection 304 a second time reverts the timeline 310 back to non-compressed events. The content selection 304, when selected, displays only content event events (213 and 218). The exit selection 306 exits the program.

The timeline 310 is the same the timeline 210 shown in FIG. 2. However, timeline 310 contains compressed event 315 that represents events 215-217. The participant can select compressed event 315 (e.g., by clicking on the compressed event 315) to display the represented events 215-217 in compressed timeline window 320. The represented events 215-217 can be displayed in the compressed timeline window 320 or alternatively be displayed as shown in timeline 210.

Figure 4:
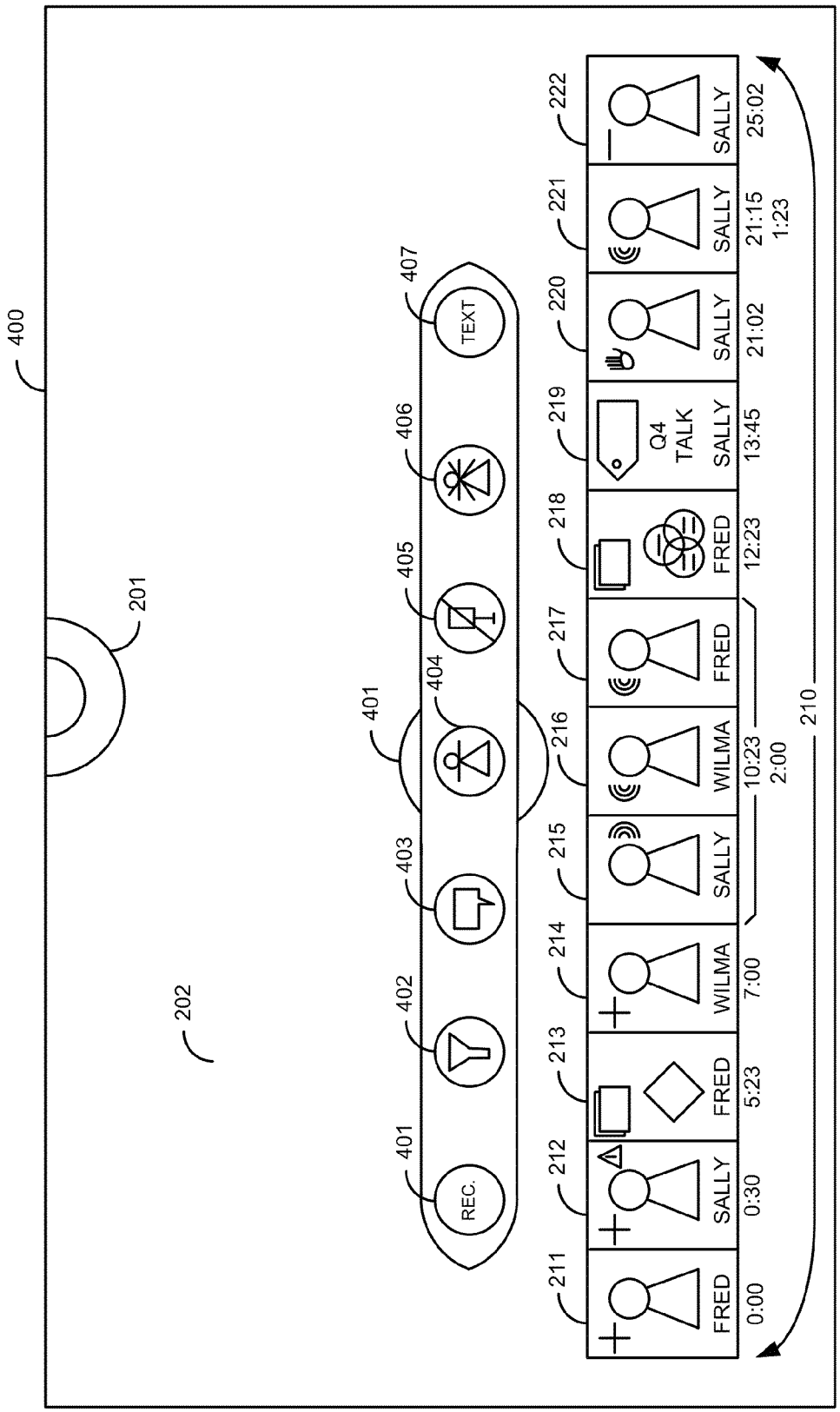
FIG. 4 is a diagram of a display of a timeline with a context menu.

FIG. 4 is a diagram of a display 400 of a timeline 210 with a context menu 401. FIG. 4 comprises the display 400, the main menu button 201, the content area 202, the timeline 210, the events 211-222, and a context menu 401. In this exemplary embodiment the context menu 401 comprises a recording item 401, a filter item 402, a chat item 403, a context icon 404, a mute item 405, a remove participant item 406, and a text item 407.

In this embodiment, the context menu 401 is displayed when a participant selects one of the events 211-222. In this example, the participant has selected the event 216 and the context menu 401 is displayed above the event 216. The context menu 401 that is displayed above the event 216 contains items 401-403 and 405-407 that are specific to the event 216. If the user selects a different type of event, the context menu 401 will contain different items that are specific to the selected event. For example, if the selected event is the event 219 (a tag event), the items in the context menu 401 would contain items specific to a tag event, such as an item for displaying the text of the tag event 219.

The record item 401 allows the participant to listen to a recording of what Wilma (indicated by event 216) spoke during that segment of the timeline 210. The filter item 402, when selected, allows the filter module 126 to filter only participant events. For example, in this embodiment, selecting the filter item 402 would result in timeline 210 displaying only participant events 211, 212, 214-217, and 220-222. The chat item 403, when selected, can provide a menu (not shown) to select a participant to have a chat with (typically the participant represented by the selected participant item 216). However, the participant may select additional participants to include in the chat session. A chat session (e.g., an Instant Message session) can then be established with the other participant(s). Likewise, a similar process may be used to establish an external voice call.

The context icon 404 represents the context for the context menu 401 and changes depending on which event is selected. For example, if the user selected a participant event, the context icon 404 represents a participant context. If the selected event is a tag event, the context icon 404 represents a tag context. The mute item 405 allows the participant to mute participant Wilma (who is represented by event 216). For example, a host may want to mute a Wilma from talking during the conference. The remove participant item 406 allows the participant to remove Wilma (who is represented by event 216) from the conference. The text item 407, when selected, provides to the participant a text representation of what Wilma spoke during that segment of the timeline 210.

All the above items are described as being generated based on a selection of items in the context menu 401. However, any of the above described processes could occur based on a participant selecting an event 211-222 (i.e., based on a defined profile). For example, if the participant selected event 221, the participant can be presented with a recording of what Sally spoke during that segment of the timeline 210 and/or the participant can be provided with a text representation of what Sally spoke during that segment of the timeline 210.

Figure 5:
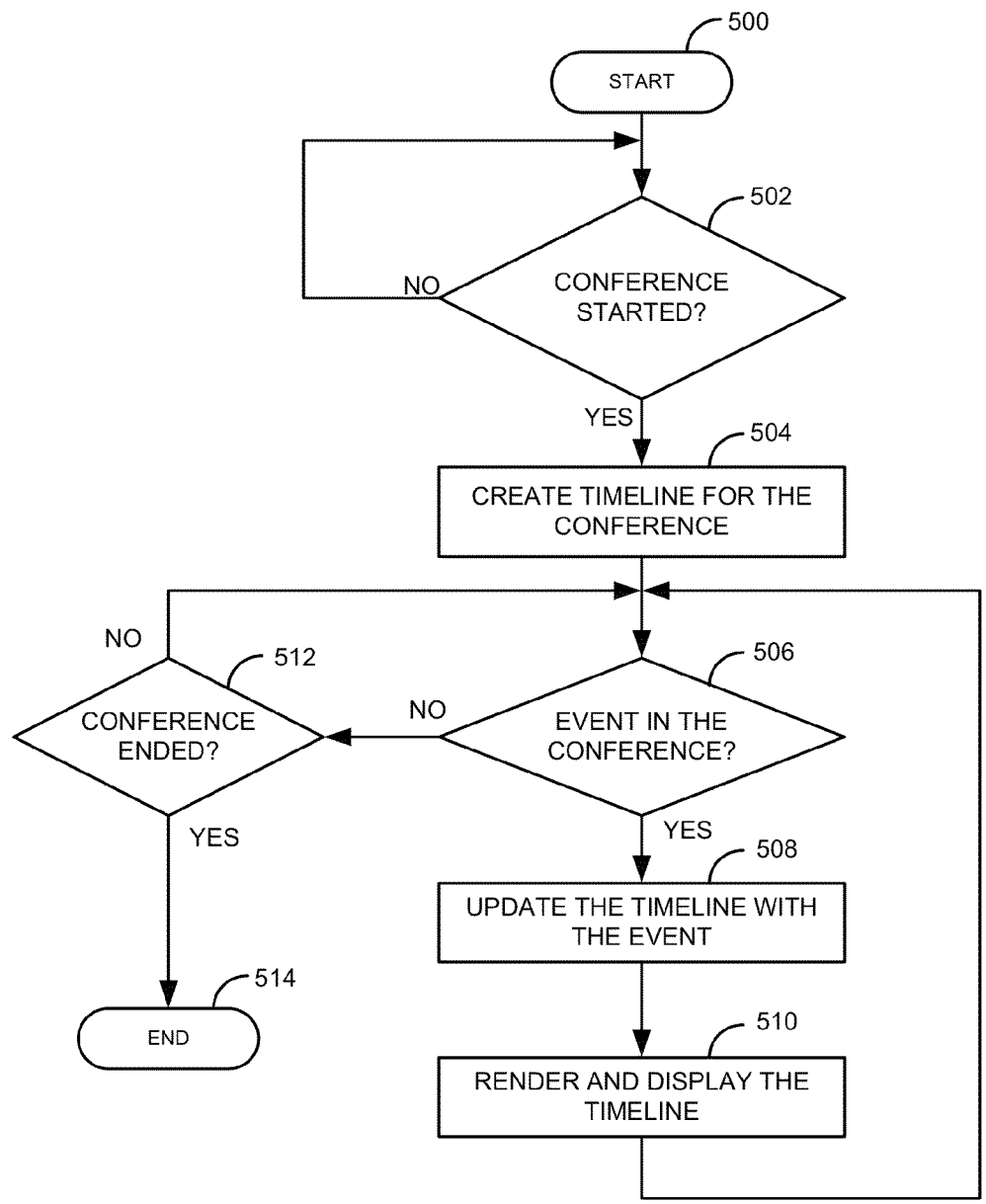
FIG. 5 is a flow diagram of a method for rendering and displaying a timeline of a conference.

FIG. 5 is a flow diagram of a method for rendering and displaying a timeline of a conference. Illustratively, the communication devices 101A-101N, the conference server 120, the conference bridge 121, the presentation module 122, the timeline generator 123, the event detector 124, the selection detector 125, and the filter module 126 are stored-program-controlled entities, such as a computer or processor, which performs the method of FIGS. 5-7 and the processes described herein by executing program instructions stored in a tangible computer readable storage medium, such as a memory or disk. Although the methods described in FIGS. 3-5 are shown in a specific order, one of skill in the art would recognize that the steps in FIGS. 3-5 may be implemented in different orders and/or be implemented in a multi-threaded environment. Moreover, various steps may be omitted or added based on implementation.

The process starts in step 500. The process identifies 502 if a conference has started. If the conference has not started in step 502, the process repeats step 502. If the process has identified that the conference has started in step 502, the process creates 504 a timeline for the conference based on an event that occurs at the start of the conference. The process determines in step 506 if an event occurred in the conference. If this is the first time through the process, the event (based on which embodiment is defined) may be the start of conference event. If an event has not occurred in the conference in step 506, the process determines in step 512 if the conference has ended. If the conference has ended in step 512, the process ends 514. Otherwise, if the conference has not ended in step 512, the process goes back to step 506.

If an event has occurred in the conference in step 506, the process updates 508 the timeline in real-time with event. The timeline is rendered 510 and displayed to one or more participants in the conference. The process goes to step 506 to determine if there are additional events in the timeline.

Figure 6:
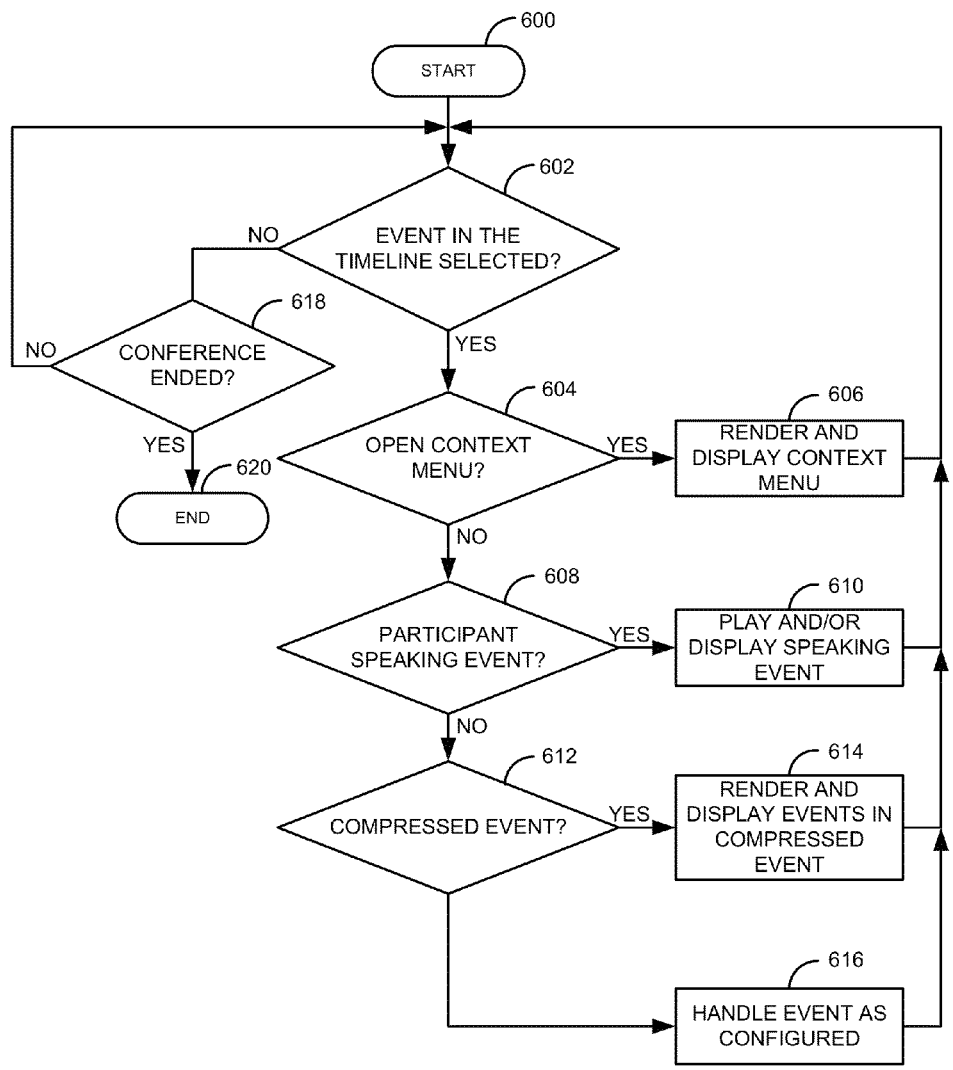
FIG. 6 is a flow diagram of a method for processing selected events in a timeline.

FIG. 6 is a flow diagram of a method for processing selected events in a timeline. The process starts in step 600. The process determines 602 if an event in the timeline has been selected. If an event in the timeline has been not selected, the process determines in step 618 if the conference has ended. If the conference has ended in step 618, the process ends 620. If the conference has not ended in step 618, the process goes to step 602.

If an even in the timeline has been selected in step 602, the process determines in step 604 whether to open a context menu. Opening a context menu can be based on a profile and/or based on the specific type of event that is selected. If the process determines to open the context menu in step 604, the process renders and displays 606 the context menu to the conference participant and the process goes to step 602.

If the process determines not to open a context menu in step 604, the process determines 608 if the selected event is a participant speaking event (e.g., events 215-217, 221, or 315). If the event is a participant speaking event in step 608, the process plays and/or displays 610 the speaking event to the participant. The process then goes to step 602.

Otherwise, if the event is not a participant speaking event in step 608, the process determines in step 612 if the event is a compressed event. If the event is a compressed event in step 612, the process renders and displays 614 the events in the compressed event. The process then goes to step 602. Otherwise, if the event is not a compressed event in step 612, the process handles 616 the event as configured and goes to step 602.

Figure 7:
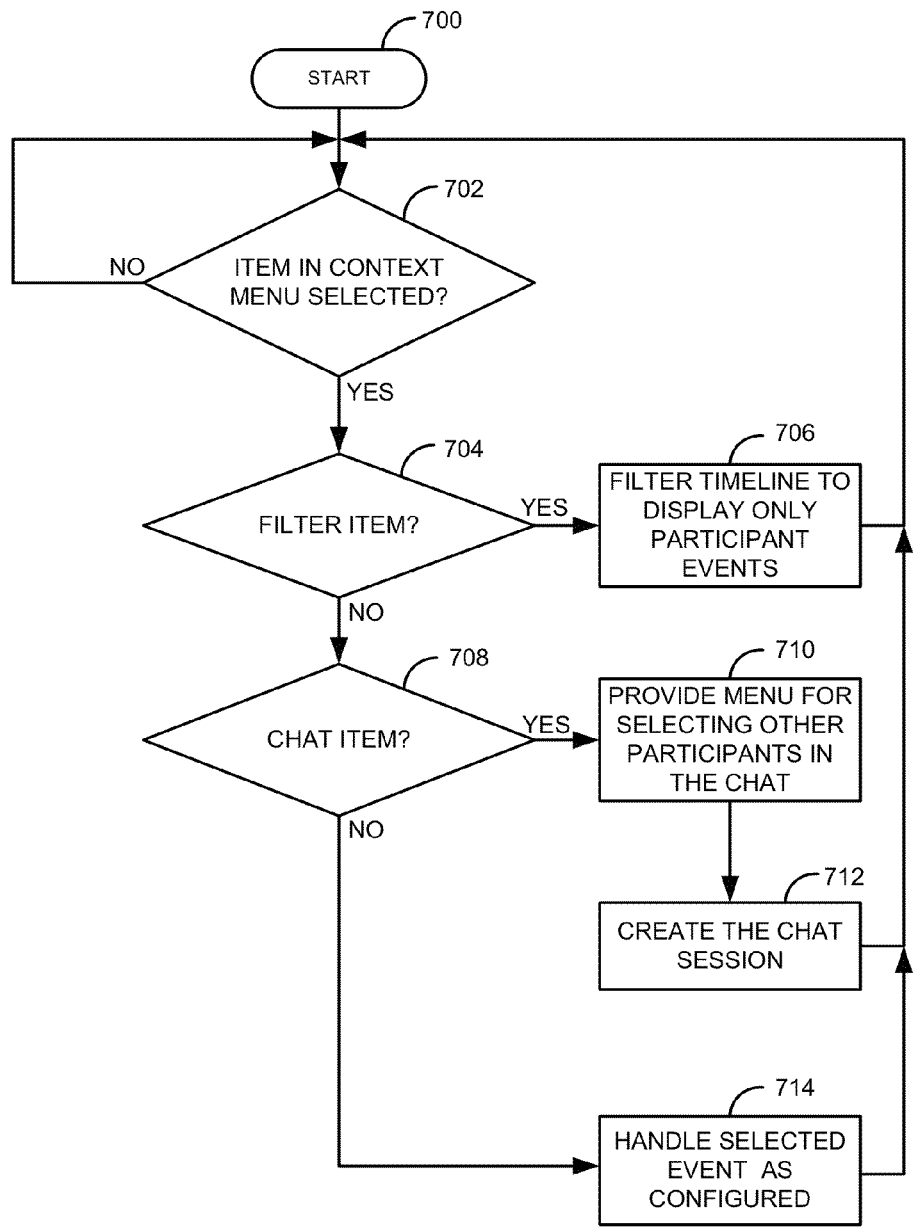
FIG. 7 is a flow diagram of a method for processing selected items in a context menu.

FIG. 7 is a flow diagram of a method for processing selected items in the context menu. The process starts in step 700. The process determines in step 702 if an item (e.g., items 401-403 and 405-407) in the context menu (the displayed context menu 401 from step 606 in FIG. 6.) has been selected. If an item in the context menu has not been selected in step 702, the process repeats step 702. If an item in the context menu has been selected in step 702, the process determines in step 704 if the selected item is a filter item. If the item is a filter item in step 704, the process filters 706 the timeline to display only participant events and the process goes to step 702.

Otherwise, if the item is not a filter item in step 704, the process determines in step 708 if the selected item is a chat item. If the selected item is a chat item in step 708, the process provides 710 a menu for selecting other participants to have a chat session with. The process creates 712 a chat session with the selected other participants. The process then goes to step 702. If the selected event is not a chat item in step 708, the process handles 714 the selected event as configured. For example, the selected item may be a recording item, a mute item, a remove participant item, a text item, a tag item, a poll item, a vote item, a vote results item, a sidebar item, an audio item, a content item, a start of conference item, an end of conference item, a call participant item, and the like. The process then goes to step 702.

Of course, various changes and modifications to the illustrative embodiment described above will be apparent to those skilled in the art. These changes and modifications can be made without departing from the spirit and the scope of the system and method and without diminishing its attendant advantages. The following claims specify the scope of the invention. Those skilled in the art will appreciate that the features described above can be combined in various ways to form multiple variations of the invention. As a result, the invention is not limited to the specific embodiments described above, but only by the following claims and their equivalents.

What is claimed is:

1. A method for managing a conference comprising:
   identifying a start of the conference;
   creating a timeline for the conference based on a first event that occurs at the start of the conference, wherein the timeline includes the first event;
   updating the timeline in real time, with a second event, as a second event occurs during the conference; and
   rendering the updated timeline for display to one or more participants in the conference, wherein the updated timeline displays a compressed event that represents a plurality of events, wherein the compressed event represents a verbal discussion between a plurality of participants in one of a plurality of segments of the conference and in response to one of the one or more participants selecting the compressed event, a plurality of verbal discussion events associated with the plurality of participants in the one of the plurality of segments of the conference are displayed to the one of the one or more participants.

2. The method of claim 1, wherein the first or second event comprise at least one of the following:
   an indication of the start of the conference;
   an indication of a participant joining the conference;
   an indication of a plurality of participants joining the conference from a conference room;
   an indication of an additional one of the plurality of participants joining the conference from the conference room;
   an indication of the participant leaving the conference;
   an indication of the plurality of participants leaving the conference from the conference room;
   an indication of one of the plurality of participants leaving the conference from the conference room;
   an indication of when the participant speaks during the conference;
   an indication of when the participant has raised their hand during the conference;
   an indication that the participant joined the conference via a telephone;
   an indication that the participant joined the conference via a videophone;
   an indication that the participant is viewing conference via a web conference;
   an indication that the participant is a required participant and has not joined the conference;
   an indication that the participant has not joined the conference;
   an indication that a tag was added to the updated timeline;
   an indication of content that was presented during the conference;
   a poll event;
   a voting event;
   a voting results event; and
   a creation of an external chat or voice session between two or more participants in the conference.

3. The method of claim 2, wherein the second event is the indication of when the participant speaks during the conference and selecting the second event provides at least one of: a recording of what the participant spoke during a segment of the updated timeline or providing a text representation of what the participant spoke during the segment of the updated timeline.

4. The method of claim 1, wherein the compressed event represents at least one of the following: events that have occurred during a segment of time of the conference; events that have occurred at the beginning of the conference; events that have occurred at the end of the conference; events that have occurred during a presentation of a specific slide; events that have occurred between tags set by a participant; and events that have been selected by the participant.

5. The method of claim 1, wherein in the updated timeline displays at least two events of at least two participants in the conference and wherein the at least two events indicate that the at least two participants were engaged in a conversation with each other during a segment of the conference.

6. The method of claim 1, wherein selecting the first or second event opens a context menu that is displayed above the respective selected first or second event in the updated timeline and wherein the context menu contains items specific to the respective selected first or second event.

7. The method of claim 6, wherein the selected first or second event is a participant event, the context menu comprises a filter item, and further comprising the steps of:
   receiving an indication of a selection of the filter item; and
   in response to receiving the selection of the filter item, filtering the updated timeline to only display participant events.

8. The method of claim 6, wherein the selected first or second event is a participant event of an individual participant, the context menu comprises a chat item, and further comprising the steps of:
receiving an indication of a selection of the chat item;
providing a menu to select at least the individual participant to have a chat with; and
establishing a chat session with at least the individual participant.

9. The method of claim 1, further comprising a main menu that displays selections regarding the conference, wherein the main menu selections comprise one or more of a content selection, a participant selection, a timeline selection, an exit selection, and a multi-level icon.

10. A system for managing a conference comprising:
a conference bridge configured identify a start of the conference;
a timeline generator configured to create a timeline for the conference based on a first event that occurs at the start of the conference and update the timeline in real time, with a second event, as a second event occurs during the conference, wherein the timeline includes the first event; and
a presentation module configured to render the updated timeline for display to one or more participants in the conference, wherein the updated timeline displays a compressed event that represents a plurality of events, wherein the compressed event represents a verbal discussion between a plurality of participants in one of a plurality of segments of the conference and in response to one of the one or more participants selecting the compressed event, a plurality of verbal discussion events associated with the plurality of participants in the one of the plurality of segments of the conference are displayed to the one of the one or more participants.

11. The system of claim 10, wherein the first or second event comprise at least one of the following:
an indication of the start of the conference;
an indication of a participant joining the conference;
an indication of a plurality of participants joining the conference from a conference room;
an indication of an additional one of the plurality of participants joining the conference from the conference room;
an indication of the participant leaving the conference;
an indication of the plurality of participants leaving the conference from the conference room;
an indication of one of the plurality of participants leaving the conference from the conference room;
an indication of when the participant speaks during the conference;
an indication of when the participant has raised their hand during the conference;
an indication that the participant joined the conference via a telephone;
an indication that the participant joined the conference via a videophone;
an indication that the participant is viewing conference via a web conference;
an indication that the participant is a required participant and has not joined the conference;
an indication that the participant has not joined the conference;
an indication that a tag was added to the updated timeline;
an indication of content that was presented during the conference;
a poll event;
a voting event;
a voting results event; and
a creation of an external chat or voice session between two or more participants in the conference.

12. The system of claim 11, further comprising a selection detector that is configured to detect a selection of the second event, wherein the second event is the indication of when the participant speaks during the conference and the selection of the second event provides at least one of: a recording of what the participant spoke during a segment of the updated timeline or providing a text representation of what the participant spoke during the segment of the updated timeline.

13. The system of claim 10, wherein in the updated timeline displays at least two events of at least two participants in the conference and wherein the at least two events indicate that the at least two participants were engaged in a conversation with each other during a segment of the conference.

14. The system of claim 10, further comprising a selection detector that is configured to detect the selection of the first or second event, wherein selection of the first or second event opens a context menu that is displayed above the respective selected first or second event in the updated timeline and wherein the context menu contains items specific to the respective selected first or second event.

15. The system of claim 14, wherein the selected first or second event is a participant event, the context menu comprises a filter item, and
the selection detector is further configured to receive an indication of a selection of the filter item; and
a filter module is configured to filter the updated timeline to only display participant events in response to receiving the selection of the filter item.

16. The system of claim 14, wherein the selected first or second event is a participant event of an individual participant, the context menu comprises a chat item, and
the selection detector is further configured to receive an indication of a selection of the chat item;
the presentation module is further configured to provide a menu to select at least the individual participant to have a chat with; and
the conference bridge is further configured to establish a chat session with at least the individual participant.

17. A non-transient computer readable medium having stored thereon instructions that cause a processor to execute a method, the method comprising:
instructions to identify a start of a conference;
instructions to create a timeline for the conference based on a first event that occurs at the start of the conference, wherein the timeline includes the first event;
instructions to update the timeline in real time, with a second event, as a second event occurs during the conference; and
instructions to render the updated timeline for display to one or more participants in the conference, wherein the updated timeline displays a compressed event that represents a plurality of events, wherein the compressed event represents a verbal discussion between a plurality of participants in one of a plurality of segments of the conference, and in response to one of the one or more participants selecting the compressed event, instructions for displaying, to the one of the one or more participants, a plurality of verbal discussion events associated with the plurality of participants in the one of the plurality of segments of the conference.

18. The method of claim 1, wherein the first or second event comprises at least one of:

an indication of a plurality of participants joining the conference from a conference room;

an indication of an additional one of the plurality of participants joining the conference from the conference room;

an indication of the plurality of participants leaving the conference from the conference room; and an indication of one of the plurality of participants leaving the conference from the conference room.

19. The method of claim 1, wherein the compressed event represents events that have occurred during a presentation of a specific slide in a user presentation, wherein the user presentation has a plurality of slides.

20. The method of claim 1, wherein the second event comprises an indication of when an individual participant has raised their hand during the conference.

\* \* \* \* \*